Feb. 20, 1940.   A. Y. NOMURA   2,191,396
PLOTTING DEVICE
Filed March 2, 1939   5 Sheets-Sheet 2
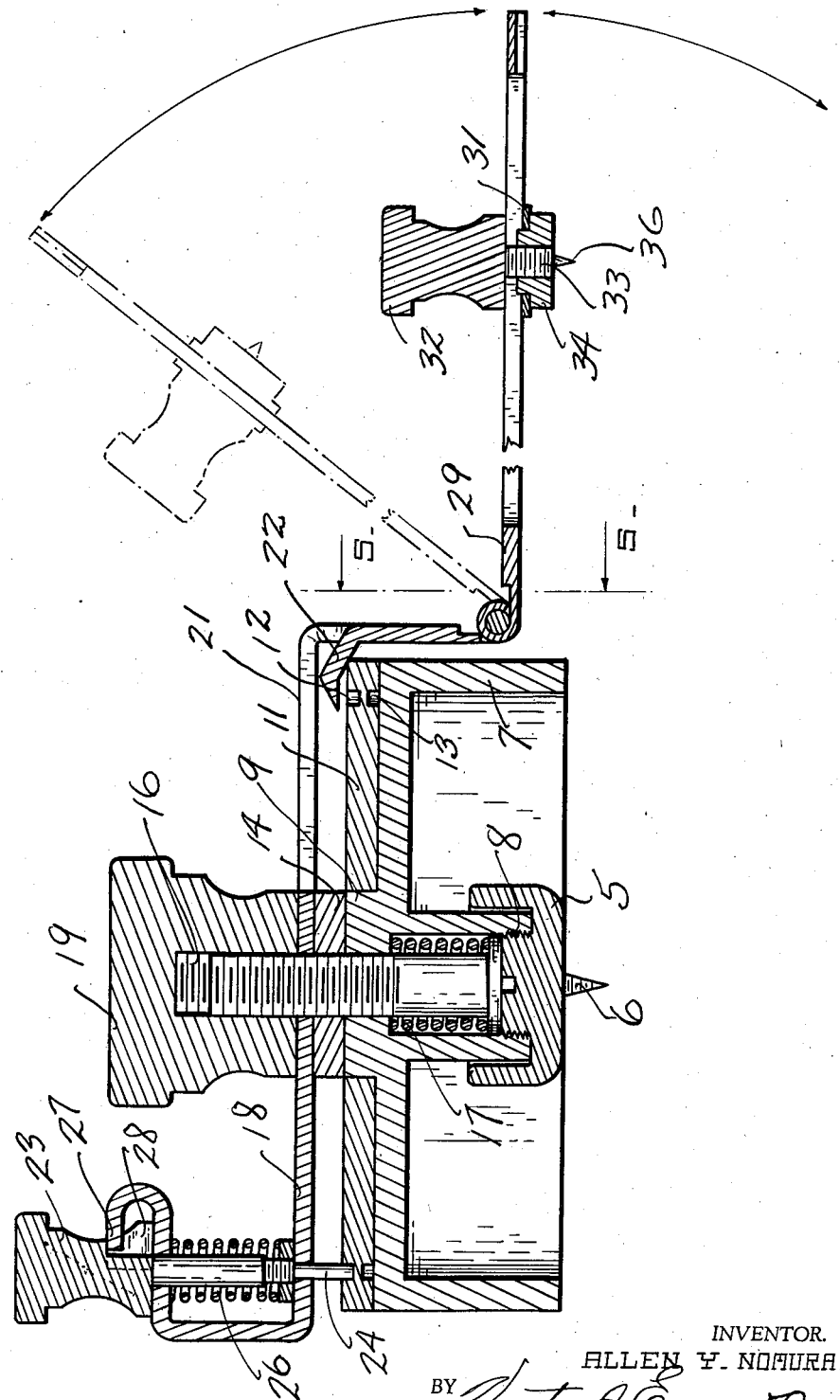
FIG-3-
INVENTOR.
ALLEN Y. NOMURA.
BY *Victor J. Evans Co*
ATTORNEYS.

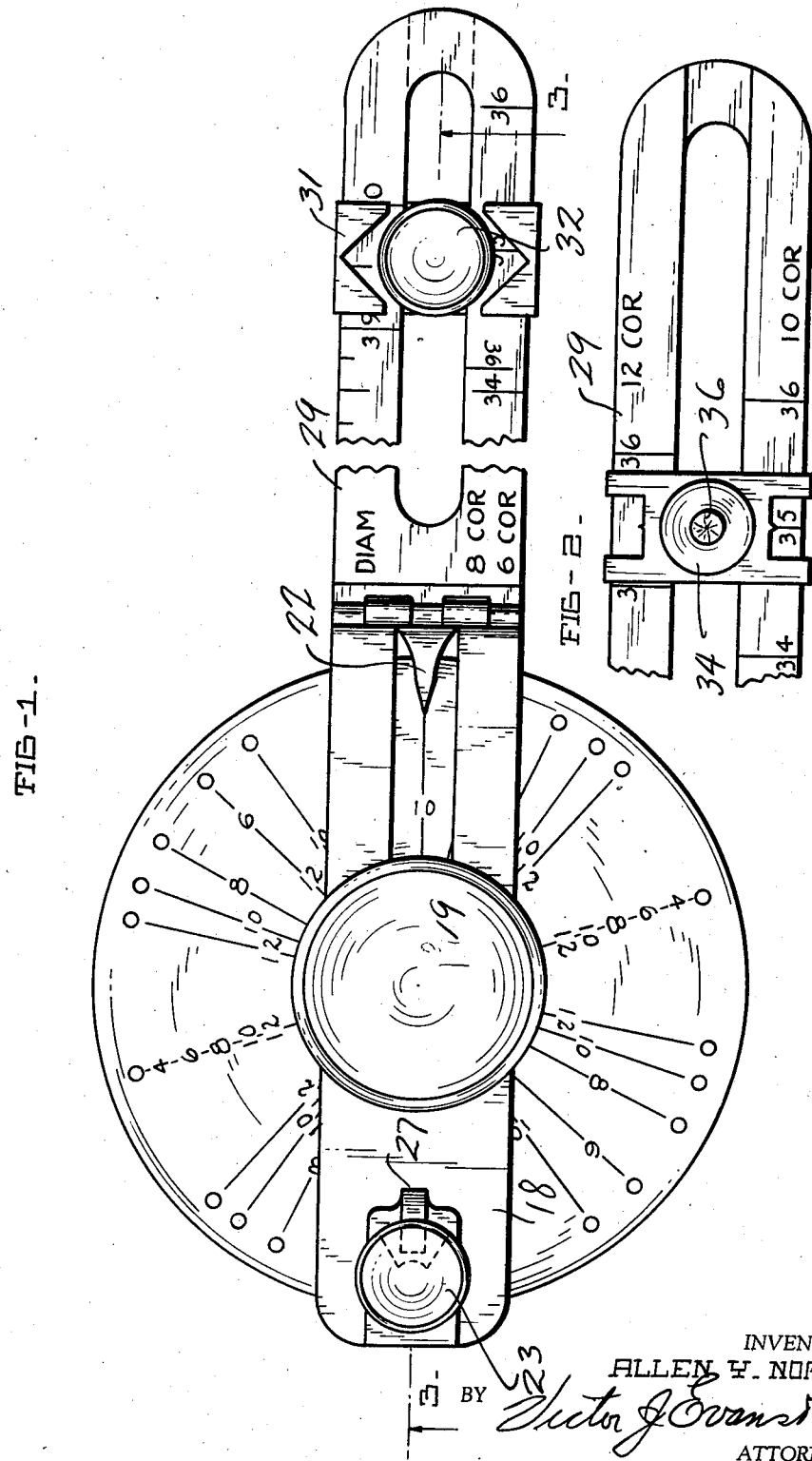

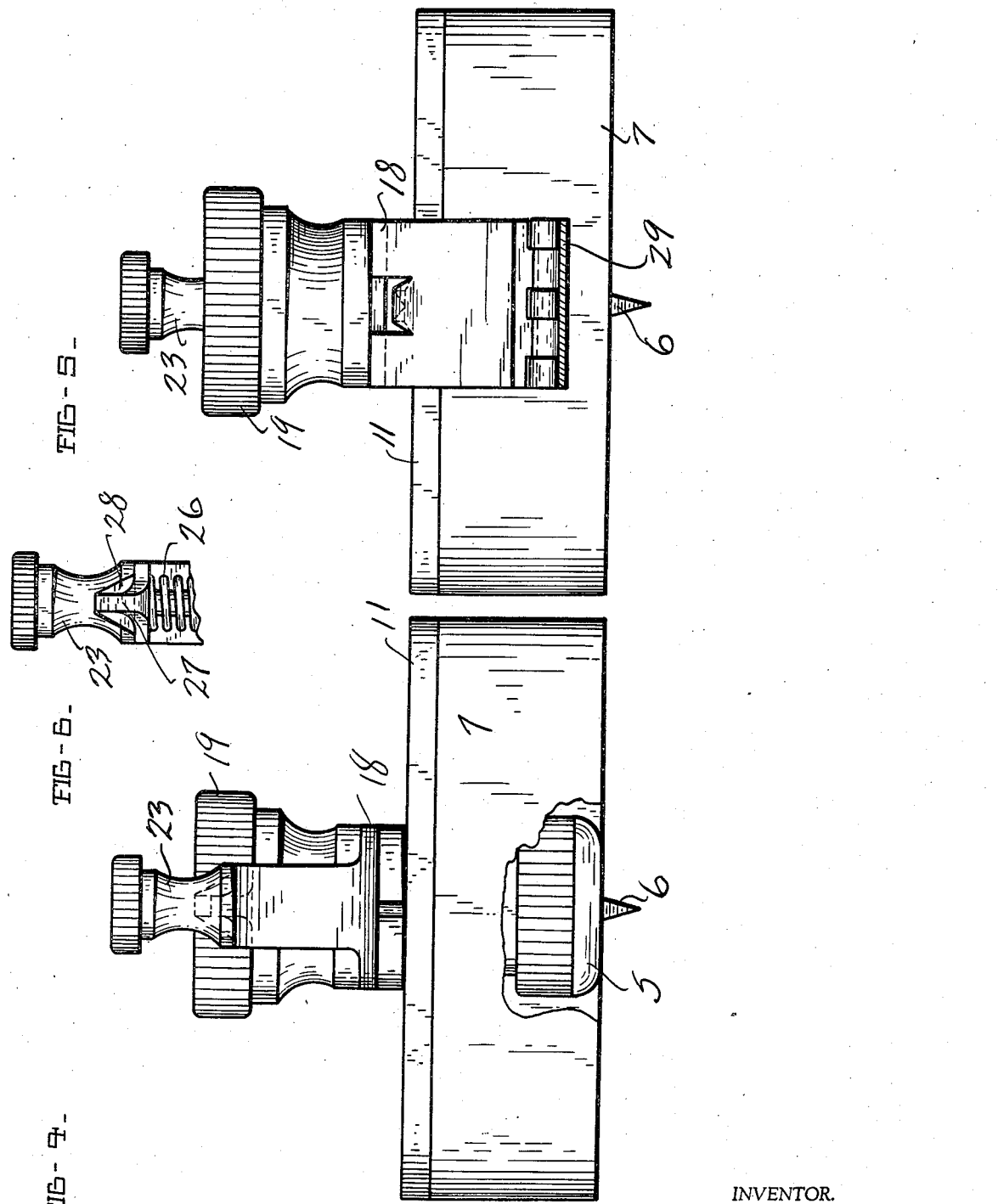

Feb. 20, 1940.   A. Y. NOMURA   2,191,396
PLOTTING DEVICE
Filed March 2, 1939   5 Sheets-Sheet 4
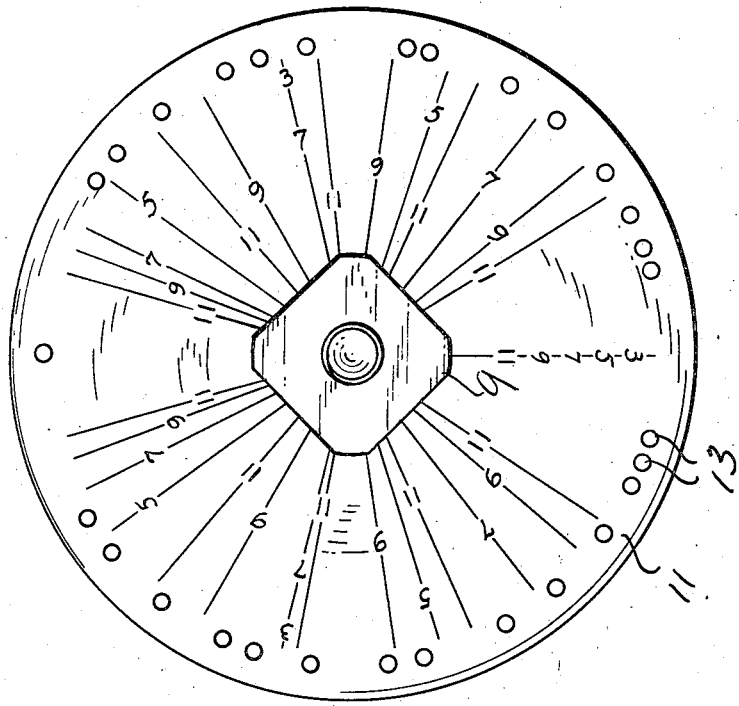
FIG-8-
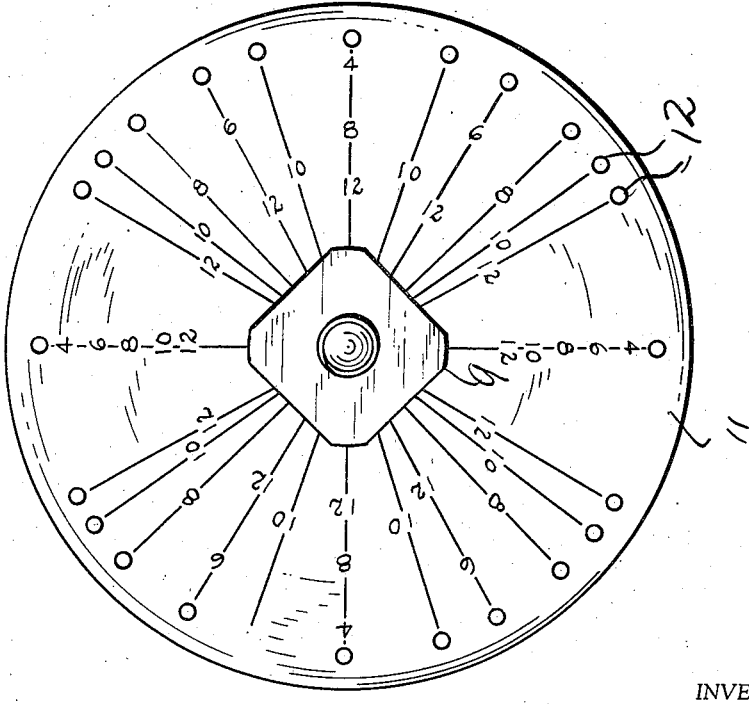
FIG-7-
INVENTOR.
ALLEN Y. NOMURA
BY
ATTORNEYS

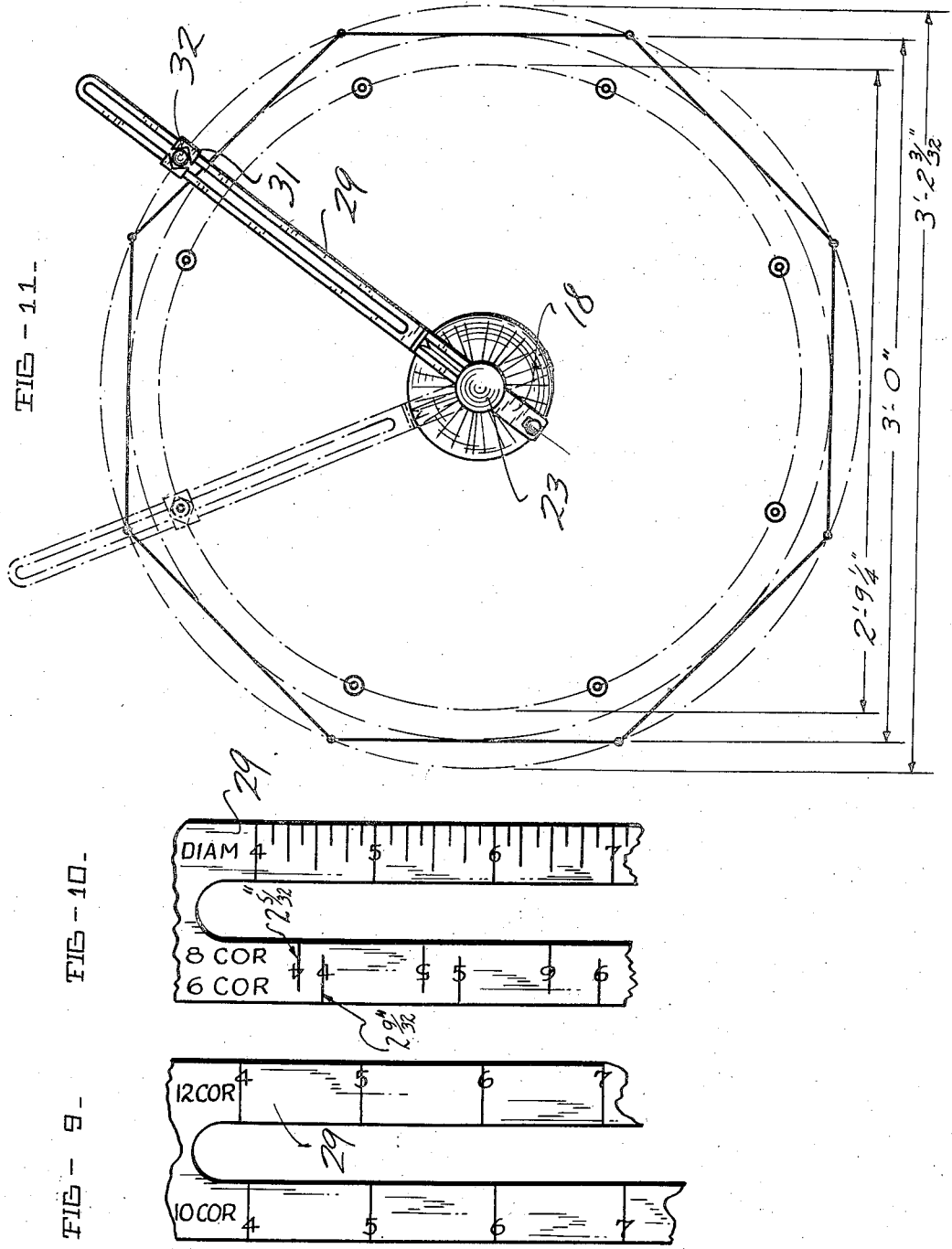

Patented Feb. 20, 1940

2,191,396

UNITED STATES PATENT OFFICE 2,191,396

PLOTTING DEVICE

Allen Y. Nomura, Honolulu, Territory of Hawaii

Application March 2, 1939, Serial No. 259,465

1 Claim. (Cl. 33—189)

This invention relates to improvements in plotting devices and has particular reference to a device for laying out many sided figures, such as polygons, hexagons, decagons, and the like.

The principal object of this invention is to produce a simple tool having indicia formed thereon which may be used for applying marks or other indicating means to a pattern or work, whereby the desired figure may be accurately laid out.

A further object is to provide means whereby a many sided figure may be constructed when the desired information is given—that is, when the sides are given as either outside circle measurement, tangent measurement, or cord measurement.

A further object is to produce a device of this character which is economical to manufacture and simple to use.

Other objects and advantages will be apparent during the course of the following description.

In the accompanying drawings forming a part of this specification and in which like numerals are employed to designate like parts throughout the same, Fig. 1 is a top plan view of my device;

Fig. 2 is a fragmentary detailed view of the bottom of the blade;

Fig. 3 is a cross sectional view taken on the line 3—3 of Fig. 1;

Fig. 4 is an end elevation of Fig. 1, looking from the left of the drawing;

Fig. 5 is a similar view taken on the line 5—5 of Fig. 3;

Fig. 6 is a fragmentary detailed view of the spring latch;

Fig. 7 is a top plan view of the even index plate;

Fig. 8 is a top plan view of the odd index plate;

Fig. 9 is a fragmentary bottom plan view of the blade, showing the indicia thereon;

Fig. 10 is a similar view of the top of the blade, showing the indicia thereon; and Fig. 11 is a diagrammatic view illustrating the manner in which my device is used.

In building or constructing various devices it is often necessary to lay out many sided structures, the number of sides determining whether it is a hexagon, decagon, etc. These many sided figures may be used to form wooden columns, hollow structures, such as concrete form, and the like. It is a tedious process to lay out such a structure without a tool such as I have devised.

In the accompanying drawings wherein for the purpose of illustration is shown a preferred embodiment of my invention, it will be noted that my device consists of a circular portion about which an arm may rotate. In Fig. 3 it will be noted that this circular structure is mounted upon a support 5 which has a screw thread 6 centrally positioned in the bottom thereof. This support 5 serves to mount a base 7 through threaded engagement 8 therewith. This base has an upwardly projecting squared head 9, upon which is positioned an index plate 11. This index plate has a series of sockets 12 formed in its upper surface and a series of sockets 13 formed in its lower surface and is held upon the head 9 by a washer 14 slidably positioned on a spring held stud 16, the spring being shown at 17, and the operation of the same is obvious.

Rotatably positioned on the stud 16 is an arm 18, the said arm being held thereto by a removable knob 19. One end of this arm is provided with a slot 21 through which the indicia on the plate 11 may be viewed; and a pointer 22 formed integral with the arm enables the user to line up the arm with the indicia line, as will be later described. This arm is also provided with a spring latch having a thumb piece 23 and a nose 24 of sufficient length to enter one of the sockets in the plate 11. A spring 26 serves to normally keep the nose pressed downwardly. A return bend in the arm 27 is so arranged as to lie within a slot 28 formed within the thumb piece 23 when the parts are in the position of Figs. 3 and 6. However, if the thumb piece 23 is raised and rotated a partial turn, the end of the return bend will underlie the base of the thumb piece 23 and hold the same elevated against the tension of the spring 26.

Pivotally attached to the opposite end of the arm 18 is a blade 29, which blade carries a slider 31 having a handle 32 which carries a stud 33 threaded into a block 34 and having a scribing pin 36 carried in the bottom of the stud. On the upper surface of the blade are two sets of markings—one set representing the diameter of a circle, and the lower set comprising two rows of figures, one designating a shape having eight corners, the other six corners. The bottom surface of the blade also carries indicia for laying out a ten cornered and a twelve cornered object.

The manner of using my device is as follows:

Assuming that it is desired to construct an eight sided object, the sides of which are cords to a three foot circle, or, in other words, a figure to be constructed within a three foot circle, and assuming that it is desired to lay out this figure directly upon a board, the operator first places the support 5 upon the board and at least 18 inches from the edge thereof. By now causing the screw 6 of the support to be embedded in the board, the support is thus securely positioned. By now bringing the base over the support and threadedly engaging the same therewith, it will be apparent that the base will thus be positioned in definite relation to the top of the board. We will assume that the plate 11 is so turned that the even index lines are uppermost. Therefore, the sockets 12 will be in a position to receive the nose 24 of the latch. The handle 32 of the slider is now loosened and the slider moved along the blade to the numeral "36", which is the diameter in inches of a three foot circle. However, this numeral "36" is in reality only 18 inches from the pivot point 6, being half the diameter of the circle. The handle 32 is now rotated so as to lock the slider at this position. By rotating the blade through an arc of 360° it will be apparent that a three foot circle will be inscribed upon the board.

In order to find the points at which the eight sides will meet, the thumb piece 23 is rotated so that the nose 24 may be acted upon by the spring 26 to enter one of the sockets 12 in a line with one of the indicia markings 8. The operator now presses downwardly upon the handle 32 sufficiently to cause the scribing pin 36 to make a definite impression at this point upon the circle. The latch 23 is now raised and the arm 18 rotated until the next indicia marking 8 comes into line with the pointer 22, and the handle 32 is again pressed upon the circle, thus leaving a second point. Thus the operator proceeds around the entire circle, marking eight points, which will be the points where lines drawn as cords will meet to form an eight sided figure. By joining these points the figure will be constructed.

The above example of an even sided figure was laid out using the figures on the upper portion of the top of the blade, as viewed in the drawings, for the reason that the information given called for a three foot no inch circle with the figure constructed inside thereof.

It will be seen from the above that an even sided or an odd sided polygon could be laid out using the top numerals in the blade if the measurement is given as, for example, a three foot no inch figure constructed within a circle. However, it is impossible to obtain the same measurements from the top numerals of the blade if the problem calls for three foot no inch for a figure measuring from one tangent to the other, as shown in Fig. 11. A difference of several inches may exist. Furthermore, the extra numerals or indicia on the lower side of the top of the blade are all different regardless of indentical measurements for the figure. As an example, 6 inches, 10 inches, 24 inches, or 36 inches may be given as the distance across from one tangent to the other. Therefore, on a six sided figure the first numeral "4" represents a 4 inch hexagon, but the distance from the screw 6 to the scribing 36 will measure $2\frac{9}{32}$ inches; for an octagon the distance will measure $2\frac{5}{32}$ inches; for a decagon the measurement will be $2\frac{3}{32}$ inches; or for a dodecagon the measurement will be $2\frac{1}{16}$ inches.

Consequently, with my device it is possible to construct a figure inside or outside of a circle of a certain diameter, or to the exact distance between the opposite tangent surfaces.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a device of the character described, a support, a screw point centrally carried by the lower base of the support for attaching the same to an object to be marked, a base carried by said support and serving to removably position an indicia bearing plate, an arm rotatably supported above and at the center of said plate, means carried by one end of said arm for interconnecting it with said plate for positioning said arm at predetermined points, the opposite end of the arm having a slot provided with an inwardly turned pointer at the periphery of the indicia plate, the outer end of the arm having a downwardly turned portion on the outside of the support, a blade pivotally connected to the lower end of the downwardly turned portion of the arm, a sliding member supported on said blade, means for securing said sliding member in its adjusted position on the blade, and a scribing point carried by said sliding member and adapted to engage the object to which the device is attached.

ALLEN Y. NOMURA.